Feb. 2, 1965   P. N. BOSSART ETAL   3,168,268
TRAIN IDENTIFICATION SYSTEMS
Filed Dec. 21, 1960   5 Sheets-Sheet 1

INVENTORS.
Paul N. Bossart and
Robert J. King
BY   W. L. Stout
THEIR ATTORNEY

INVENTORS.
Paul N. Bossart and
Robert J. King
BY
W. L. Stout
THEIR ATTORNEY

Feb. 2, 1965 P. N. BOSSART ETAL 3,168,268
TRAIN IDENTIFICATION SYSTEMS
Filed Dec. 21, 1960 5 Sheets-Sheet 4

INVENTORS.
Paul N. Bossart and
Robert J. King
BY W. L. Stout.
THEIR ATTORNEY

INVENTORS.
Paul N. Bossart and
Robert J. King
BY W. L. Stout.
THEIR ATTORNEY

United States Patent Office 3,168,268
Patented Feb. 2, 1965

3,168,268
TRAIN IDENTIFICATION SYSTEMS
Paul N. Bossart, Cheswick, and Robert J. King, Churchill Borough, Pa., assignors to Westinghouse Air Brake Company, Wilmerding, Pa., a corporation of Pennsylvania
Filed Dec. 21, 1960, Ser. No. 77,444
4 Claims. (Cl. 246—2)

Our invention relates to automatic identification systems, and more specifically to a system wherein a railway vehicle radiates its identification to trackside.

In order to more fully approach the automatic operation and control of the various types of rolling stock used on railroads ranging from a completely automatic classification of freight cars to the controlled movement of many trains over long distances, one of the most basic and essential requirements is the detection and automatic identification of these cars and trains. It is a principal object of the present invention therefore to provide an automatic identification system which can be used to identify individual freight cars and entire trains.

One specific example of where such an automatic identification system would be particularly useful is at interlockings. In order to govern the movement of trains at such locations, which movements can become fairly complex in terminal yards and at junctions, an interlocking switch and signal system is usually provided which clears a path for a train through a multiple track route by locking the signals of any conflicting route in their stop positions. At the present time interlocking systems are usually operated by signalmen who exercise complete control over the switches and signals within a given area. Another object of this invention is the provision of an automatic system of train identification which would enable the foregoing operation to be accomplished automatically and more economically.

A more particular object of the invention is to provide an identification system which will enable moving trains to radiate their identification to trackside receivers.

A further object of the present invention is the provision of a system made up of both wayside and vehicle mounted equipment which is both simple and inexpensive to install and operate.

A still further object of this invention is the provision of an identification system which is readily alterable and extensible to meet different operational requirements, and is characterized by an unusual simplicity of construction, operation, and maintenance.

Generally, the automatic train identification systems in use at present are sharply limited in the number of possible code patterns they are capable of transmitting to trackside and serve only to actuate in a more or less indirect manner a relatively few switches and signals located in the immediate vicinity. Furthermore, such systems are generally expensive to install and maintain. These and other practical limitations serve to curtail their scope of usefulness and, accordingly, such systems are usually confined to areas having a relatively few units to be identified and to control operations of a rather simple nature.

On the other hand, a still further specific and unique object of this invention is to provide an identification system which, for all practical purposes, is unlimited in the number of possible code patterns it can transmit and sense and therefore in the number of units it can identify.

Furthermore, it is an additional object of this invention to provide a system capable of handling a variety of coding techniques including coding systems which are in a form acceptable to a variety of standard data processing equipment.

Briefly stated, the identification system of the present invention, which may be employed, by way of example, by a railroad, provides for a plurality of radiating areas in the form of magnetized elements mounted on a train and arranged polaritywise to radiate a coded pattern corresponding to the identification number of the train. At appropriately positioned wayside locations, apparatus responsive to the polarity arrangement of the train-mounted magnetizeed elements is provided to receive and transfer the coded bits radiated by the passing train to an identification network.

Other objects, applications, attributes, and advantages of the invention will become apparent as the description proceeds.

The accompanying drawings illustrate, in a simplified and diagrammatic manner, the preferred form and various adaptations or modifications of the apparatus which serve to transmit and receive the identification of the passing vehicle.

In describing the invention in detail, reference will be made to the accompanying drawings, in which like reference characters designate corresponding parts throughout the several views, and in which:

FIG. 4, illustrate the manner in which the car-carried magnetized elements cooperate with the wayside detector as well as one form of wayside circuitry controlled by the wayside detector.

Similar reference characters refer to similar parts in each of the several views.

Figure 1:
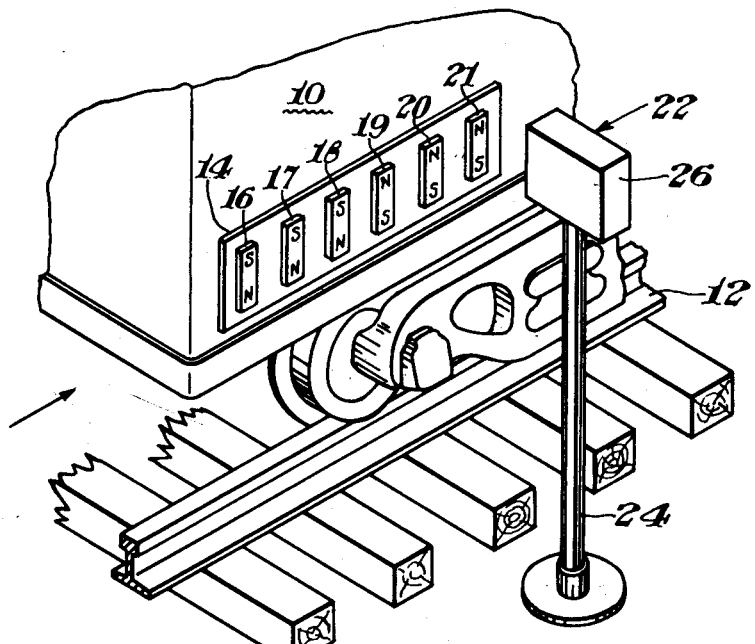
FIG. 1 is a fragmentary view in perspective showing a portion of a car, on which magnetized elements have been arranged in a coded pattern in accordance with the invention for cooperation with a wayside detector responsive to the arrangement.

The apparatus shown in connection with FIGS. 1 to 7, inclusive, relates to railway systems and the control of traffic thereon. However, it should be understood that the principles of the invention are of general application and their association with railway systems is shown as a matter of convenience.

In order to simplify the description and the tracing of circuits a number of conventions have been employed as outlined below.

First, energy for operation of most of the apparatus shown is furnished by a suitable source of direct current such as a battery of proper voltage and capacity. For purposes of simplicity this power source is not shown in the drawings but its positive and negative terminals are identified by conventional reference characters B and N, respectively.

Each of a plurality of double wound magnetic stick relays MR1, MR2, MR3, MR4, MR5 and MR6 is shown in the drawings by a rectangular geometric figure divided into upper and lower portions representing the windings, within each of which is a conventional arrow designating both the direction of current flow through the winding and the position to which the contacts will be moved when the winding becomes energized. Thus in the upper division of the rectangular figures current flows in the direction of the arrow and the relay contacts will be operated to their left-hand or normal position. In the lower divisions current flows in the opposite direction and will cause the relay contacts to close in the right-hand or reverse position. When any of these relays are deenergized, the contacts remain in the position to which they were last operated. All other relays shown are of the neutral type. The contacts of the magnetic stick and neutral type relays are shown directly below the rectangle representing the winding of the relay and indicated as associated therewith by the usual dashed vertical line extending from the winding to each contact.

Two of the relays in the drawings are slow-acting relays, that is, either slow to release or slow to pick up, or both. The contacts of such relays are shown in the conventional manner by an arrow drawn vertically through the movable portion of the contact with the head of the arrow pointed in the direction its contact is slow acting. In the case of the slow-pickup, slow-release relay, an arrowhead is provided on both ends of the vertical line through the movable portion of the relays' contact.

In carrying out the illustrative embodiment of our invention, we provide a stepping switch SS which may be of the rotary type well known in the electrical art. Said switch has a plurality of double-ended wipers commonly mounted on a shaft and insulated from each other, each wiper being rotated simultaneously with the others in a counterclockwise direction over a semi-circular bank of contact points, the number of said points being as desired or found necessary. In such switches each bank of points is designated as a level, all of said levels being substantially parallel to each other. An electromagnet MS common to all the wipers of the switch causes the switch to step when the circuit to the magnet is closed.

When the automatic identification system provided by this invention is used in conjunction with a railroad interlocking arrangement, it is contemplated that each train to be identified will be equipped with a radiant unit consisting of a series of magnetized elements in a suitable support and arranged to form a binary code pattern. This radiant unit may be removably secured in a rack at the head end of the train, along a side or under portion thereof, with the detecting units appropriately positioned at trackside. Through the use of an appropriate tie-in network between the wayside detector and the interlocking switch and signal system, the radiated identification pattern from the passing train may be used, to set up in advance, a route through the interlocking in accordance with the identity and destination of the train.

Turning now to the drawings for a detailed consideration of the above-outlined embodiment, FIG. 1 shows a piece of rolling stock, which may be a car 10 forming part of a train and moving, in the direction indicated by the arrow, on a section of track 12, with a frame 14 secured, in any well-known manner, to its side. Mounted in spaced-apart relationship on frame 14, which may be formed of any nonmagnetic material, is an array of elongate magnetic members 16, 17, 18, 19, 20, and 21, here shown as permanent magnets although these members could equally well be magnetized electrically if desired. Positioned along the side of track 12 at substantially the same level as the car-mounted magnetic members 16–21, is a detector 22 capable of being influenced by the members. The detector 22 is mounted on a stand 24 and enclosed within a nonmagnetic housing 26 which is substantially water and dust proof.

The magnetic members 16–21, shown in FIG. 1 in one of several possible arrangements on the vehicle to be identified, are arranged polaritywise within frame 14 to form an identification code using the binary decimal notation. Thus, by way of example, the arrangement of magnetic member 16 with its south pole facing upwardly and the north pole downwardly can represent a binary one. On the other hand, member 19, which has been positioned polaritywise just the opposite of member 16, that is with its north pole facing upwardly and the south pole downwardly, can represent a binary zero. Reading the array in FIG. 1 from left to right in accordance with the aforesaid representation, yields the binary equivalent of 111000. This binary combination can be an identity in itself or can represent a numeric and/or alphabetic symbol.

The number of magnetic members required will, for the most part, be determined by the number of units to be coded. For example, if fifty trains are operating within a given area in which this identification system is used in conjunction with the various interlockings, an array of six magnets can be arranged to provide sixty-four codes or fourteen more than necessary to identify the fifty trains.

Although the binary notation has been used to illustrate one possible coding arrangement, since it enjoys a special condition of simplicity and adaptability for machine processing, it is to be understood that number systems other than binary are adaptable for use in this identification system.

As previously stated, members 16–21, shown in FIG. 1, may be either of the permanent or the electromagnetic type depending on the nature of the use and the territory within which the identification unit will be used. Thus in electrified territory, with its ever present strong magnetic fields, an electromagnetic array would avoid the possibility of the demagnetization of one or more of the members and thereby assure an accurate radiated code pattern. However, in the absence of such extreme adverse conditions as outlined above, an array made up of good quality permanent magnets will radiate a strong, reliable identification pattern easily read by the detection apparatus described in detail below.

Figure 2:
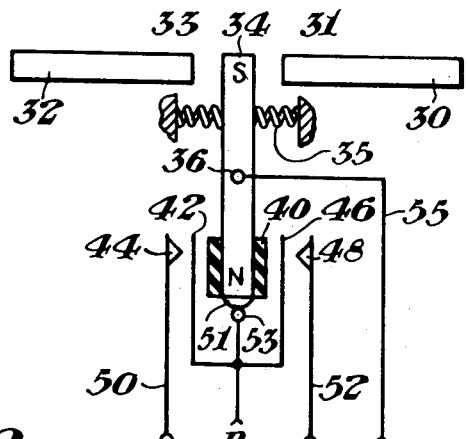
FIG. 2 is a simplified diagrammatic view of the wayside detector.

The detector 22, illustrated in diagrammatic detail in FIG. 2, is shown having a pair of soft iron pole pieces 30, 32 positioned in spaced-apart relation in substantially the same plane. A polarized armature 34, shown biased to a neutral position, by means of a spring 35, is pivoted at 36 and positioned to rock toward one or the other of pole pieces 30, 32 to assume an actuating first or second position when a magnetic flux is passing through the aforesaid pole pieces as a result of certain conditions, the nature and effect of which will be hereinafter described in detail. For purposes of illustration only, the ends of armature 34 have been arbitrarily assigned polarity markings, indicating the south pole as located between pole pieces 30, 32. When armature 34 is moved into the referred-to first or second position, it rocks about pivot 36 causing insulating sleeve 40, secured to its north end, to close contacts 42–44 or 46–48 depending on whether the south end of armature 34 is attracted toward pole piece 30 or 32. As is apparent from the drawing, the closing of either one of the sets of contacts 42–44 or 46–48 will provide a path from terminal B of the source to wire 50 or 52, as the case may be. When armature 34 is in the neutral position, contact 51–53 is closed, thereby providing a current path from terminal B through the armature to wire 55.

It is to be noted in passing, that polarized armature 34 can be either a permanent magnet or a soft iron member in which a polarized condition is induced by an outside source.

Figure 3:
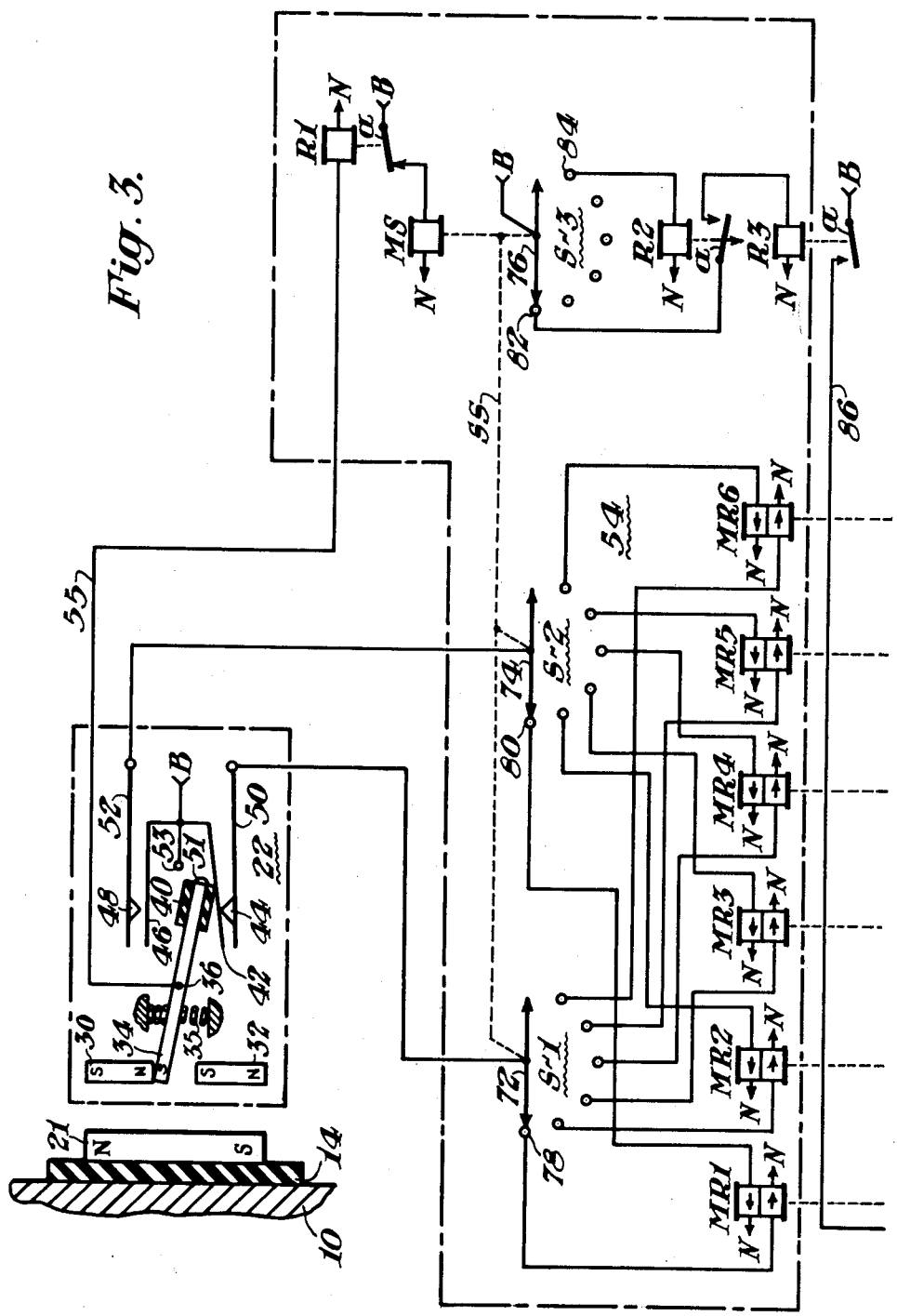
FIGS. 3 and 4 are diagrammatic views which, when placed with FIG. 3 above

Turning now to a consideration of the operation of the identification system when the train-carried members 16–21 are passing a wayside sensing unit 22, reference will be made to FIGS. 3 and 4 wherein the polar axis of one of the magnetic members 21 is shown with its field in magnetic registry with the longitudinal axis of the soft iron pole pieces 30, 32 of detector 22. During this registry interval, the flux in the magnetic field of member 21 is directed through the soft iron pole pieces 30, 32 to take advantage of the greater permeability of the magnetic material. As a result, the pole pieces are temporarily polarized, as indicated in FIG. 3, causing the south pole of armature 34 to be attracted from its biased neutral position to the north end of pole piece 30. When armature 34 rocks around pivot 36 to assume this position, insulating sleeve 40, at its north end, presses contact 42 against contact 44 causing current to flow from terminal B through wire 50.

As car 10 moves along track 12 in the direction indicated in FIG. 1, the effect of the magnetic field of member 21 on detector 22 will rapidly lessen, allowing armature 34 to return to its biased neutral position where it remains until the field of member 20 is in magnetic registry with pole pieces 30, 32. Since the polarity arrangement of members 16, 17, 18 is similar, armature 34 will rock toward pole piece 30 as each one is moved into magnetic registry with detector 22. On the other hand, the polarity arrangement of each of elements 16, 17 and 18 is just the opposite to that of elements 19, 20 and 21, with the result that armature 34 will rock toward pole piece 32 as each of elements 19, 20 and 21 is moved into magnetic registry with detector 22, thereby closing contacts 46–48 to energize wire 52 from terminal B.

As armature 34 is rocked about pivot 36 in response to the alternating polarization of pole pieces 30, 32 by the passing elements 16–21, the intermittent pulses of current sent through wires 50 and 52 are fed into a train identity detecting network 54 through a multi-level or multi-bank stepping switch SS to sequentially energize one or the other of a pair of windings in each of a series of magnetic relays MR1 through MR6.

The stepping switch SS has switch banks or levels S–1, S–2 and S–3 whose wipers 72, 74 and 76 are stepped by a magnet MS, as described below, to engage successively and simultaneously corresponding contacts of the respective banks. A conventional ratchet wheel and pawl arrangement, not shown, is linked to the armature of magnet MS, and the operation is such that upon energization of magnet MS, the pawl is lifted against the tension of a spring, and when the magnet is deenergized, the pawl engages the ratchet wheel and advances the wiper shaft and wipers through such an angle as to move the wiper contact end in a counterclockwise direction from one bank contact to the next. This construction is conventional and further illustration thereof is deemed unnecessary.

Each of the corresponding contacts in banks S–1 and S–2 is connected through appropriate conductors to a separate winding of magnetic stick relays MR1 through MR6 in a manner whereby a pulse from detector 22 along wire 50 and through first contact 78 of bank S–1 causes the contact of relay MR1 to swing to the right as indicated by the arrow on the bottom half of the rectangle representing the relay. On the other hand, a pulse along wire 52 of detector 22 through first contact 80 of bank S–2 will cause the contact of relay MR1 to swing to the left as indicated by the direction of the arrow on the upper half of said rectangle. In either event the relay is set with its contact positioned to the right or left depending upon whether the pulse is fed through wire 50 to bank S–1 or wire 52 to bank S–2.

Each time armature 34 returns to its biased neutral position a circuit is completed for energizing relay R1 from battery terminal B over contacts 53–51, armature 34, conductor 55 and the relay winding to terminal N. As a result, back contact a opens, deenergizing magnet MS and causing wipers 72, 74 and 76 to simultaneously step from one contact to the next in a manner hereinbefore described. In this way the polarity arrangement of each of the passing train mounted magnets is recorded through a contact in bank S–1 or S–2 by positioning the contact of one of the relays MR1 through MR6. Assuming for the purposes of this illustrative embodiment that six train-carried magnetic members are sufficient to identify the various trains moving in a given area, then a six-position stepping switch connected in the manner shown in FIG. 4 to six relays MR1 to MR6 is required to record the polarity arrangement of each element.

The third bank S–3 of stepping switch SS is used to effect a readout of the contacts of relays MR1 through MR6 after they have been positioned in accordance with the polarity arrangement of the passing train-mounted magnetic members 16 to 21. To accomplish this, contact 84 is connected through the winding of a slow-release relay R2 to terminal N. In addition contact 82 is connected through front contact a of relay R2 and the winding of relay R3 to terminal N. The remaining four contacts in the bank are unused. During the cycle of movement of the stepping switch, the advance of wiper 76 will have no effect on the network until it reaches contact 84. At this point the last magnetic member 16 will be in registry with the detector 22. A positive potential from terminal B applied through wiper 76 energizes relay R2 by flowing through contact 84 and the relay winding to terminal N, thereby closing the front contact a of relay R2. As the magnetic influence of passing member 16 on detector 22 diminishes, armature 34 returns to its biased neutral position causing magnet MS to step the switches in a manner hereinbefore described. Accordingly, wiper 76 will step from contact 84 to contact 82 thereby energizing relay R3, through front contact a of relay R2, and the winding of relay R3 to terminal N, to close front contact a of relay R3. The slow-release feature of relay R2 insures that the relay will bridge the stepping period of wiper 76 from contacts 84 to 82 in order to allow relay R3 to become energized, and thereby provide a path for current to flow from terminal B over its front contact a and through line 86. As a result a readout of the positioned contacts of relays MR1 through MR6 is effected in a manner outlined below.

Figure 4:
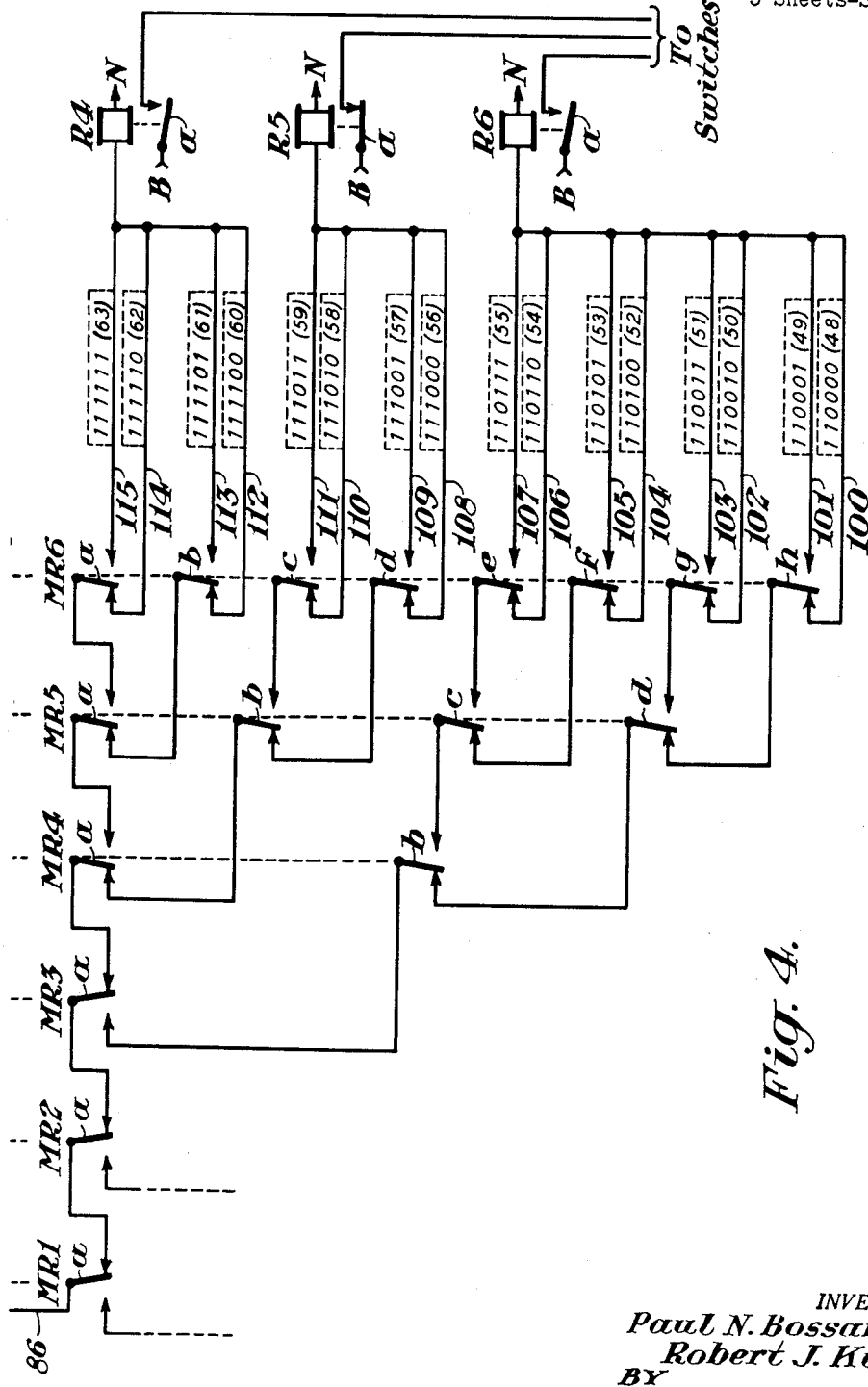

Turning now to a detailed consideration of FIG. 4, a portion of the contacts of relays MR1 through MR6 is shown with conductors 100 through 115 extending therefrom to route control relays R4, R5 and R6. More specifically and in accordance with the arrangement of the magnetic members 16 through 21 shown in FIG. 1, the contacts of relays MR1 through MR6 are positioned as shown in FIG. 4 and a circuit may be traced from terminal B over the front point of contact a of relay R3 and thence through conductor 86, reverse contacts a of relays MR1, MR2 and MR3, normal contacts a, b and d of relays MR4, MR5 and MR6, respectively, conductor 108, and the winding of route control relay R5 to terminal N.

The energization of relay R5 closes its front contact a thereby supplying energy from terminal B to the appropriate switches for providing a predetermined path through an interlocking.

The code transmitted by the passing car 10, as shown in FIG. 1, and its decimal equivalent in accordance with commonly used binary and decimal values, is indicated for illustrative purposes only in FIG. 4 within a dotted enclosure above conductor 108, as binary 111000 and, in parenthesis, decimal 56. In a similar fashion, conductors 100 through 107 and 109 through 115 have a binary and decimal representation, noted within dotted enclosures above each of their respective conductors, corresponding to the coded polarity arrangement of the train-carried magnetic members which cause the contacts of relays MR1 through MR6 to be positioned in a manner whereby current will flow from terminal B over the aforesaid contacts and through its line wire.

Considering the decimal representations of the binary codes as the identification numbers of the passing trains it is apparent that trains 60 through 63 will be identified along conductors 112 through 115, respectively, and further that these four trains will move along the same route established through an interlocking when route control relay R4 is energized. Likewise, the passing of trains 56 through 59 will result in the flow of current along conductors 108 through 111, respectively, to energize route control relay R5 thereby automatically actuating the appropriate switches in advance. A generally similar arrangement and response would be provided for the remaining trains, numbered 55 and below, operating within the control area.

Figure 6:
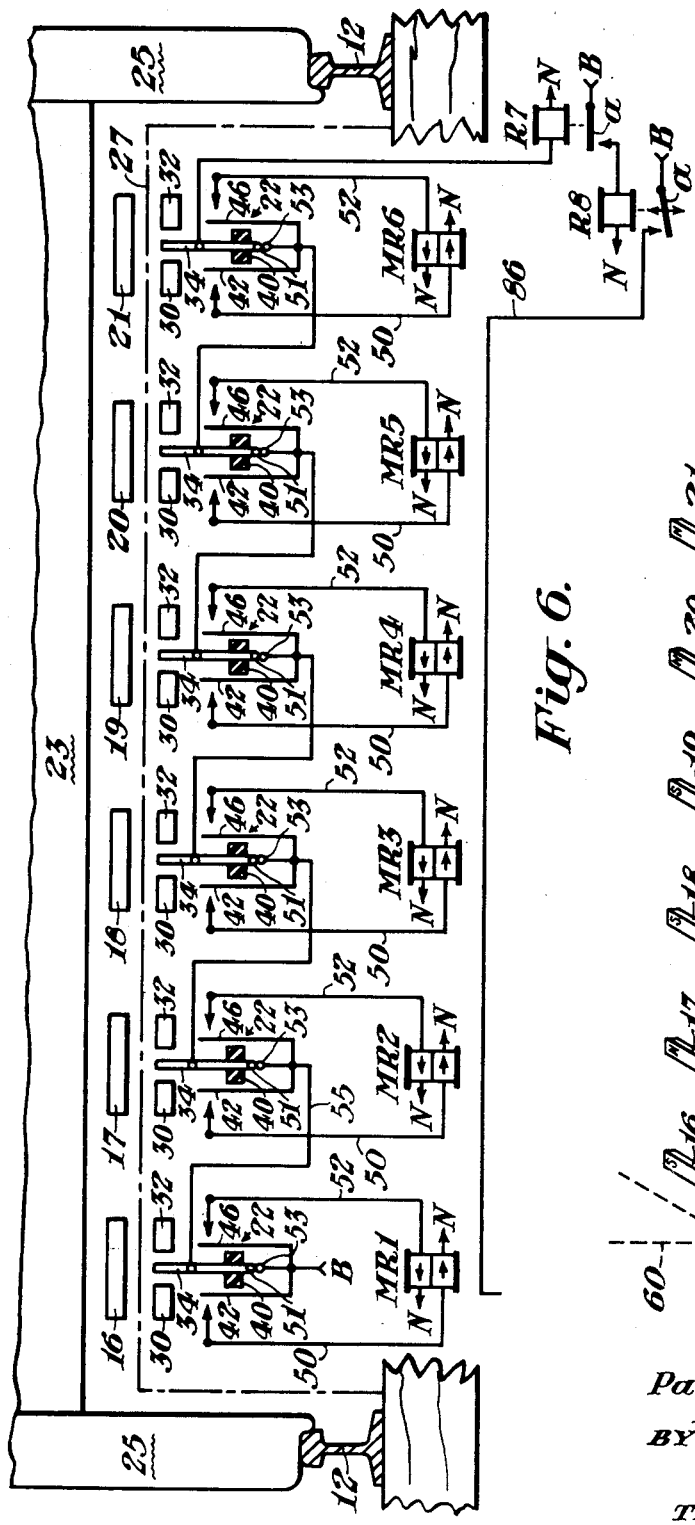
FIG. 6 is a plan view of still another arrangement of the car mounted magnetized elements and trackway detectors together with associated circuitry and, when placed above FIG. 4, forms a second embodiment of the invention.
Figure 5:
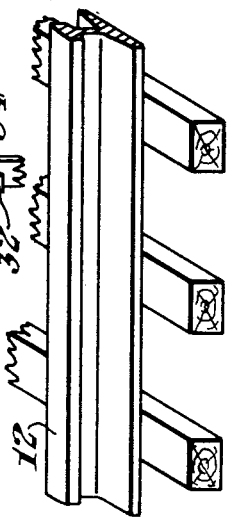
FIG. 5 is a view partly diagramamtic and partly in section showing another arrangement of car-mounted magnetized members and cooperating wayside detector.

In the foregoing description of the operation of the identification system embodying our invention, an arrangement was provided wherein the magnetic members 16–21 are positioned with their polar axis substantially perpendicular to track 12. However, various other arrangements of the magnetic members are practicable and, depending upon the particular circumstances, perhaps even preferable. FIGS. 5 and 6 illustrate other array patterns which may be formed on the vehicle or object to be identified.

FIG. 5 diagrammatically illustrates a modified arrangement wherein the magnetic members 16–21 are arrayed on the underside of a vehicle 60 with their polar axis transverse to the longitudinal axis of track 12. A trackside detector 22 is positioned below and within magnetic registry of the passing array of elements 16–21 to read out the coded pattern element-by-element as vehicle 60 moves along on track 12. The pattern as sequentially read out may be fed into the circuitry arrangement shown in FIGS. 3 and 4 from the detector 22 through the identity network 54 to the route control relays R4, R5 and R6 in the same manner as outlined with respect to the arrangement shown in FIG. 1.

A simultaneous readout of all the vehicle-carried magnets may be achieved by the arrangement shown in FIG. 6 wherein members 16–21 are disposed in end-to-end alignment along the underside of the car with their polar axis in substantial parallelism to the axle 23 of wheels 25. Positioned in the trackway between rails 12 are a series of magnetic detectors 22 each within magnetic registry of one of the magnetic members 16–21. As the vehicle-carried magnetic members 16–21 are moved into magnetic registry with the trackway detectors 22, biased armatures 34 (biasing means not shown) will rock toward one or the other of pole pieces 30, 32 with the resulting transfer of electrical energy through one or the other of a pair of conductors 50, 52 as outlined above. However, since the coded pulse transfer is simultaneous rather than sequential, the stepping switches shown in FIG. 3 may be dispensed with and each pulse may be fed directly through the appropriate one of a pair of windings in the magnetic stick relay which corresponds to the vehicle-mounted member which generated the pulse. The result is that the relays MR1 through MR6 are simultaneously energized and their contacts positioned in accordance with the polarity arrangement of the passing members 16–21.

A readout arrangement is provided whereby current is applied through the positioned contacts of relays MR1 through MR6 after all armatures 34 of detectors 22 have returned to their biased neutral position. This is accomplished by connecting contact 53 of one of the detectors 22 to terminal B and then, by appropriate circuitry, the remaining armatures 34 of the detectors 22 in series with each other through contacts 53–51, the winding of relay R7 to terminal N, all as shown in FIG. 6.

Prior to the passage of the magnetic members 16–21 over detectors 22, armatures 34 are in their biased neutral position, thereby completing a circuit from terminal B through relay R7 to open its back contact a. However, when the magnetic members 16–21 are in magnetic registry with their respective detectors 22, contacts 51–53 are broken as armatures 34 rock toward pole piece 30 or 32 and relay R7 is deenergized, thereby closing back contact a to complete an energizing circuit for relay R8. As a result of the slow pickup and slow release characteristics of relay R8, sufficient time is allowed for armatures 34 to energize their respective magnetic stick relays MR1 through MR6 before front contact a of relay R8 is closed and the coded circuit through the contacts of the magnetic stick relays is energized from terminal B, over the aforesaid contact a, and through wire 86 in the same manner as outlined with respect to the circuit illustrated in FIG. 4. Accordingly, reference may be made to FIG. 4 for the contact matrix and associated circuitry employed to establish the train identity and provide a predetermined route through an interlocking.

Figure 7:
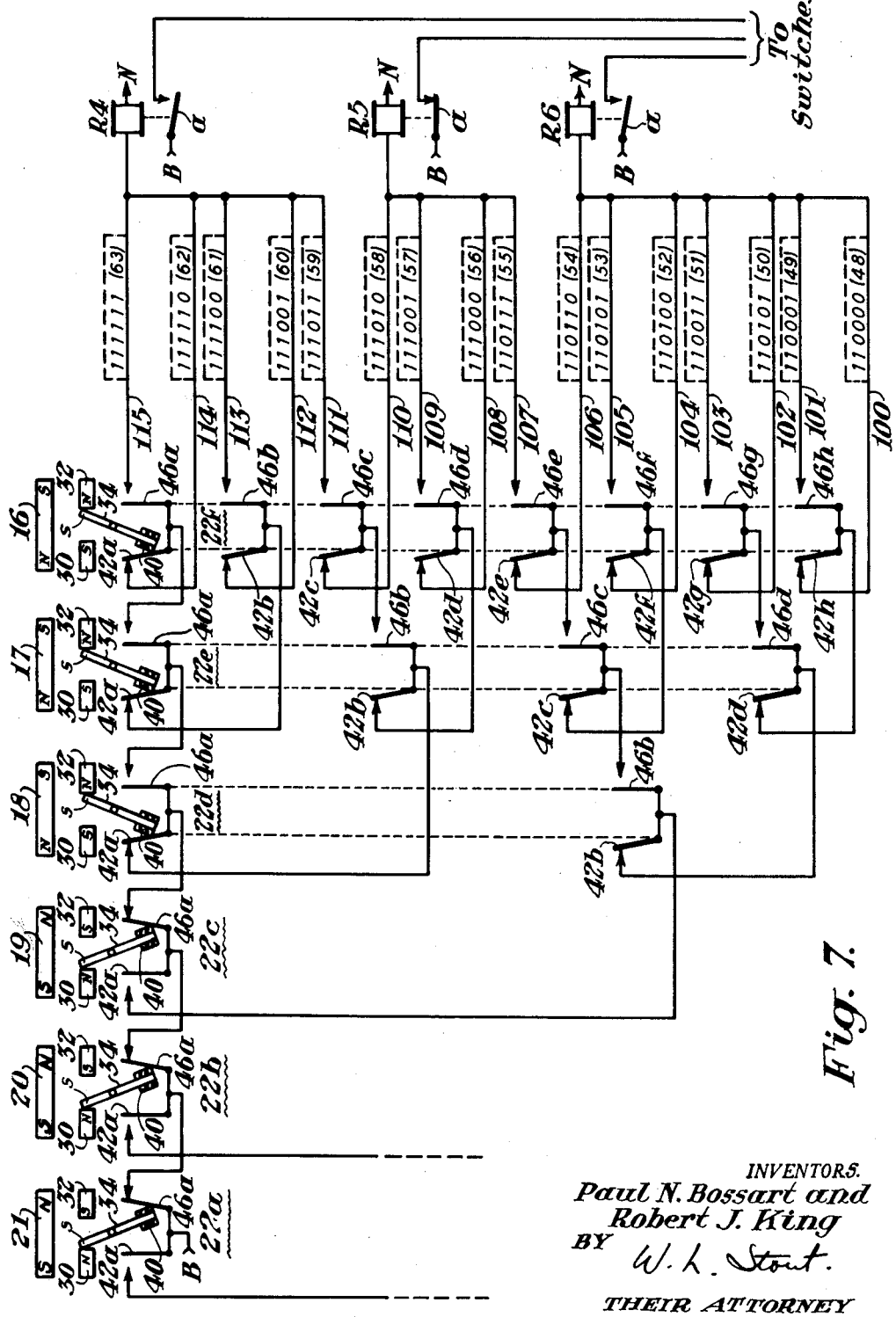
FIG. 7 is a plan view of a simplified modfication of the arrangement shown in FIG. 6, together with associated circuitry.

Referring now to FIG. 7, I have shown a simplified modification of the apparatus illustrated in FIG. 6 which achieves the same results. In this simplified arrangement the biasing means is eliminated from armatures 34 of detectors 22 so that armatures 34 remain in the position to which they were last operated by the train mounted magnetic members 16–21. In addition, the need for relays MR1 through MR6 and relays R7 and R8 is eliminated by providing a bank of electrically isolated contacts mounted in multiple with contacts 42, 46 in each detector 22. The number of contacts 42, 46 in each detector 22 is equivalent to the corresponding contact structure arrangement in relays MR1 through MR6 shown in FIG. 4. As a result of these modifications, route control relays R4, R5 and R6 are directly energized through the banks of detector contacts 42, 46 in accordance with the coded arrangement of the passing train mounted magnetic members 16–21. For example, tracing the circuit in FIG. 7 energized by the movement of armatures 34, in detectors 22a–22f, against their respective pole pieces 30 or 32, shown temporarily polarized by magnetic members 16–21, current flows from terminal B over contacts 46a of detectors 22a, 22b, 22c, contacts 42a, 42b and 42d of detectors 22d, 22e and 22f, respectively, through wire 108 and the winding of route control relay R5 to terminal N.

The energization of relay R5 closes its front contact a, thereby supplying energy from terminal B to the appropriate switches for providing a predetermined path through an interlocking.

Any of a number of well-known devices for detecting the polarity arrangement of a magnetic field may be used in place of detector 22. A disclosure of one such device is shown in Letters Patent of the United States No. 2,016,977, granted on October 8, 1935, to Henry P. Thomas, for Direction Response System.

Although the present invention has provided a system for detecting the identity of trains it is to be understood that this form is selected to facilitate the disclosure of the invention rather than to limit the number of forms which it may assume or the number of applications in which it may be employed. Moreover, it is to be further understood that various modifications, adaptations and alterations may be applied to the specific form shown to meet the requirements of practice, without in any manner departing from the spirit or scope of the present invention.

Having thus described our invention, what we claim is:

1. A system for identifying a moving object comprising, a plurality of magnetic members each having a north and a south pole and being mounted on said object and arranged polaritywise to radiate a binary coded identification pattern, a wayside device including a pair of spaced pole pieces of magnetic material disposed substantially in the same plane as said members and polarized by and when in magnetic registry with said members, a plurality of contacts, a movable polarized armature spaced between said pole pieces having an intermediate neutral position and adapted to be rocked into a first or second position to actuate one or another of said contacts according to the polarity induced in said pole pieces by said members, and means responsive to the contacts actuated for determining the identity of said object.

2. A system for identifying a moving object comprising, a plurality of magnetic members each having a north and a south pole and being mounted on said object in an array extending transversely to its direction of movement and arranged polaritywise to radiate a binary identification pattern, a plurality of wayside magnetic detectors arranged transversely of the direction of movement of said object each including a pair of spaced pole pieces disposed substantially in the same plane as said members and polarized by and when in registry with one of said members, a plurality of contacts, a movable polarized armature spaced between said pole pieces, said armature having a biased neutral position and adapted to be rocked into a first or second position to close one or another of said contacts according to the polarity induced in said pole pieces by said members, and means responsive to said actuated contacts for identifying said moving object.

3. A system for detecting the identity of a moving object comprising, an identification unit mounted on said object, said unit having a plurality of magnetized elements each having a north and a south pole and being arranged thereon polaritywise to radiate a binary coded identification pattern, a wayside magnetic detector responsive to the polarity arrangement of the magnetic elements for reading out said binary coded identification pattern element-by-element, said magnetic detector including a pair of spaced pole pieces of magnetic material disposed substantially in the same plane as said elements and polarized by and when in magnetic registry with one of said members, a plurality of contacts, a polarized armature spaced between said pole pieces and having a biased neutral position and adapted to be rocked into a first or second position to close one or another of said contacts according to the polarity induced in said pole pieces by said members, and identification means responsive to actuation of said contacts for determining the identity of said object.

4. A train identification system for automatic routing of a train comprising, an identification unit mounted on said train and having a plurality of magnetized elements thereon each having a north and a south pole and being arranged polarity-wise to form a binary coded identification pattern, a wayside magnetic detector including a pair of spaced pole pieces of magnetic material disposed substantially in the same plane as said elements and being responsive to the polarity arrangement of said elements when in magnetic registry with said elements, a plurality of contacts, a movable polarized armature spaced between said pole pieces and having an intermediate neutral position and being adapted to be rocked into a first or second position to actuate one or another of said contacts according to the polarity induced in said pole pieces by said elements, the actuation of said contacts generating signals representative of the coded identification pattern formed by said elements, identity network means having connections to the wayside detector and being responsive to the generated signals to identify the train and transfer an appropriate train identity representation, and switch and signal control means controlled by said identity network means for effecting the appropriate route over which said train is to move.

References Cited in the file of this patent

UNITED STATES PATENTS

| | | |
|---|---|---|
| 2,016,977 | Thomas | Oct. 8, 1935 |
| 2,414,472 | Loughridge | Jan. 21, 1947 |
| 2,628,572 | Le Goff | Feb. 17, 1953 |
| 2,857,059 | Goerlich et al. | Oct. 21, 1958 |
| 2,877,718 | Mittag | Mar. 17, 1959 |
| 2,908,777 | Strandberg | Oct. 13, 1959 |
| 2,981,830 | Davis et al. | Apr. 25, 1961 |
| 3,016,456 | Corporon | Jan. 9, 1962 |
| 3,030,499 | Pagenhardt | Apr. 17, 1962 |
| 3,040,323 | Brenner et al. | June 19, 1962 |
| 3,075,653 | Wales et al. | Jan. 29, 1963 |
| 3,106,706 | Kolanowski et al. | Oct. 8, 1963 |
| 3,117,754 | Morganstern | Jan. 14, 1964 |

FOREIGN PATENTS

| | | |
|---|---|---|
| 627,291 | Canada | Sept. 12, 1961 |
| 1,158,885 | France | Feb. 3, 1958 |
| 748,807 | Great Britain | Aug. 24, 1954 |
| 798,538 | Great Britain | July 23, 1958 |
| 800,190 | Great Britain | Aug. 20, 1958 |
| 807,343 | Great Britain | Jan. 14, 1959 |